US 6,572,993 B2

(12) United States Patent
Singh et al.

(10) Patent No.: US 6,572,993 B2
(45) Date of Patent: Jun. 3, 2003

(54) FUEL CELL SYSTEMS WITH CONTROLLED ANODE EXHAUST

(75) Inventors: Prabhakar Singh, Richland, WA (US); Mehrdad Teimor, Northville, MI (US); Walter Franklin Clark, Plymouth, WI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 222 days.

(21) Appl. No.: 09/742,757

(22) Filed: Dec. 20, 2000

(65) Prior Publication Data

US 2002/0076588 A1 Jun. 20, 2002

(51) Int. Cl.[7] .............................. H01M 8/04; H01M 8/12
(52) U.S. Cl. .............................. 429/24; 429/17; 429/23
(58) Field of Search .......................... 429/12, 13, 17, 429/19, 20, 22, 23, 24, 38, 39

(56) References Cited

U.S. PATENT DOCUMENTS

| | | | | |
|---|---|---|---|---|
| 5,401,589 A | * | 3/1995 | Palmer et al. ................. | 429/13 |
| 5,969,435 A | * | 10/1999 | Wilhelm ....................... | 307/64 |
| 6,077,620 A | * | 6/2000 | Pettit ........................... | 429/17 |
| 6,159,626 A | * | 12/2000 | Keskula et al. ................ | 429/12 |
| 6,232,005 B1 | * | 5/2001 | Pettit ........................... | 429/19 |
| 6,268,074 B1 | * | 7/2001 | Siepierski et al. ............. | 429/13 |
| 6,306,531 B1 | * | 10/2001 | Clingerman et al. .......... | 429/19 |
| 6,316,134 B1 | * | 11/2001 | Cownden et al. .............. | 429/12 |
| 6,380,637 B1 | * | 4/2002 | Hsu et al. ..................... | 290/1 R |
| 6,391,484 B1 | * | 5/2002 | Keskula et al. ................ | 429/13 |
| 6,410,175 B1 | * | 6/2002 | Tillmetz et al. ................ | 429/13 |
| 6,416,893 B1 | * | 7/2002 | Clingerman et al. .......... | 429/17 |
| 6,436,561 B1 | * | 8/2002 | Hart-Predmore et al. ..... | 429/12 |

* cited by examiner

Primary Examiner—Randy Gulakowski
Assistant Examiner—Donald V. Scaltrito
(74) Attorney, Agent, or Firm—John Kajander

(57) ABSTRACT

An electrical storage device is coupled in parallel to a fuel cell contained within a fuel cell power generation system. The electrical storage device is either a battery pack, a plurality of capacitors, or a plurality of supercapacitors and is capable of electrochemically oxidizing a quantity of reformer gas contained within an anode chamber of the fuel cell during transient load conditions by charging from a preset state of charge towards full capacity. The energy storage device thereby prevents large quantities of unoxidized reformer gas from entering a chamber of a combuster during transient load conditions, unoxidized reformer gas that generates a tremendous amount of heat when burned that can corrode or damage the combuster. The energy storage device discharges the excess charge when the fuel cell power generation system returns to normal load conditions or during transient load conditions when the amount of reformer gas entering the anode chamber has been reduced so that the amount of unoxidized reformer gas entering the combuster is maintained at a nearly constant level.

20 Claims, 2 Drawing Sheets

FUEL CELL SYSTEMS WITH CONTROLLED ANODE EXHAUST

TECHNICAL FIELD

The present invention relates generally to fuel cell systems and more particularly to fuel cell systems with controlled anode exhaust.

BACKGROUND

Fuel cell systems currently being developed for power generation applications operate on basically the same electrochemical principles as a battery system to generate electricity. Fuel cell systems generally consist of a reformer, a fuel cell stack, and an power converter (generator).

In a typical power generation system, first the reformer, or fuel processor, converts a feedstock, typically a hydrocarbon fuel such as gasoline or natural gas, into a hydrogen rich gas. Many types of reformers can be used to convert the feedstock, including steam reformers, auto thermal reformers, partial oxidation reformers, preferential oxidation reformers, and high and low temperature shift processing reformers.

Next, the hydrogen gas stream is removed from the reformer and fed into an anode chamber of a fuel cell stack for electrochemical oxidation. In this step, the hydrogen rich gas is oxidized in the presence of a catalyst contained on the walls of the anode chamber to form hydrogen protons and electrons. An electrolytic membrane allows the hydrogen protons to enter a cathode chamber, where the hydrogen protons react with oxygen from air to form water and heat that is released from the cathode chamber into the atmosphere. The electrons within the cathode chamber exit the fuel cell along an external remote load wire and are converted by the generator to usable power. By stacking a few hundred fuel cells together to form a fuel cell stack, the amount of power generated can be substantially increased. Unoxidized fuel within the anode chamber exits the fuel cell and enters a combuster for burning.

During normal operating conditions, wherein the electrical load demand on the fuel cell remains relatively steady, the oxidation reaction efficiency of the fuel cell is relatively constant at approximately 80-90%. The amount of unoxidized fuel thus entering the combuster therefore remains relatively constant, and as such the combuster temperature that is a function of the amount of unoxidized fuel burned within the combuster is maintained within an acceptable range.

However, under transient operating conditions, wherein the electrical load demand on the fuel cell could be decreased, the amount of unoxidized fuel within the anode chamber substantially increases. Burning of this excess unoxidized fuel in the combuster leads to the generation of high temperatures and accelerated corrosion (or melting) of the combuster material. Such temperature transients in the combuster require expensive construction materials and higher quality insulation to provide thermal stability in the combuster. Combustion of the unoxidized fuel in the combuster also reduces the overall fuel system efficiency.

Another alternative is to recycle the unoxidized fuel through the inlet anode gas stream of the fuel cell. However, recycling and injection of hydrogen depleted tail gas in the anode gas stream leads to increased parasitic power loss.

It is thus highly desirable to control the temperature in the combuster by improving the electrochemical oxidation of the fuel within the fuel cell during transient load conditions.

SUMMARY OF THE INVENTION

The present invention overcomes the above identified deficiencies of presently available fuel cell systems by providing a means for oxidizing heated reformed fuel gas in a fuel cell during transient load conditions. Electrochemical oxidation of the fuel in the fuel cell minimizes or prevents a buildup of anode gas in the anode chamber. Also, combustion of unoxidized gas is minimized in the combuster, thereby preventing excess heat buildup in the combuster that could damage the fuel processing assembly.

The above objects are accomplished by providing a methodology for operating a fuel cell power generation system in conjunction with an energy storage system in a parallel mode operation to prevent transient increases in the combustion of anode gas during changes in electrical load demand. The energy storage device consists of either a battery pack or a bank of capacitors/super capacitors that are attached in parallel to the fuel cell system such that both can provide power during normal and/or transient operations. Normally unoxidized reformed gas within the anode chamber during transient conditions is oxidized and the electrical energy created by the oxidation stored in an energy storage device. This prevents the discharge of larger than normal amounts of reformer gas to the combuster, gas that normally results in very high temperature combustion within the combuster (approximately 1400-1500 degrees Celsius) that can cause corrosion (or melting) of combuster material or otherwise damage to the fuel processing assembly.

Other objects and advantages of the present invention will become apparent upon considering the following detailed description and appended claims, and upon reference to the accompanying drawings.

DESCRIPTION OF THE PREFERRED EMBODIMENT(S)

The present invention describes a methodology of operating a fuel cell power generation system in conjunction with an energy storage system in a parallel mode operation to prevent transient increases in the combustion of anode gas during changes in the electrical load demand.

Figure 1:
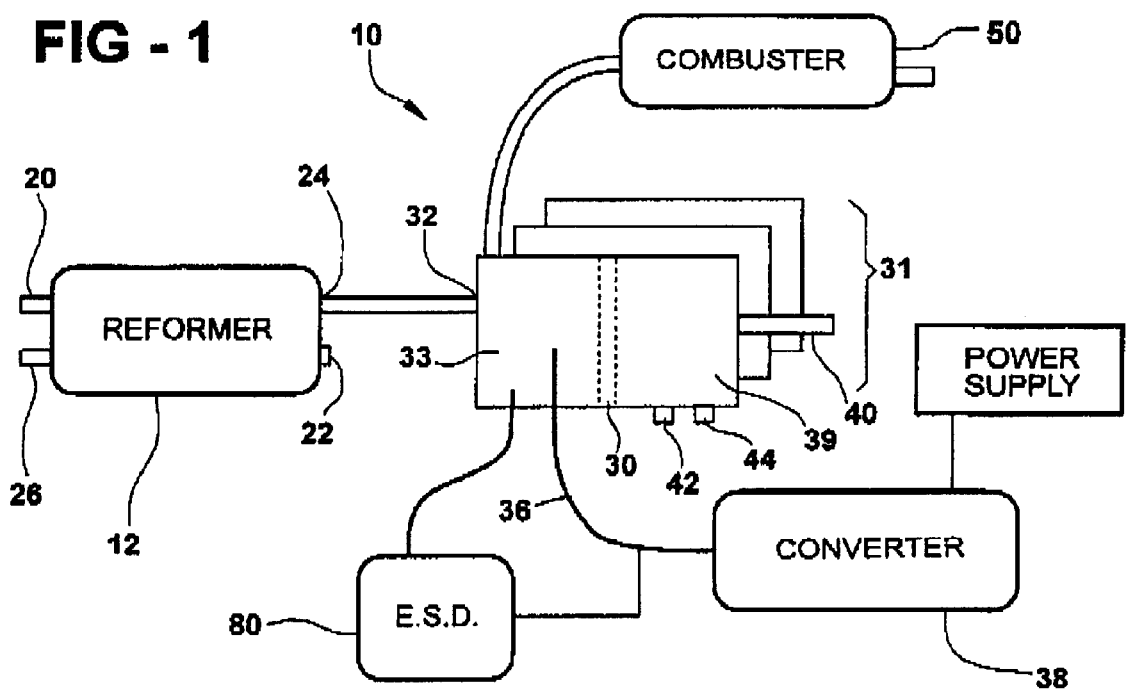
FIG. 1 is a schematic representation of a fuel cell power generation system having an energy storage device according to the preferred embodiment of the present invention.

Referring now to FIG. 1, a fuel processing assembly 10 is depicted. The assembly 10 includes a heat exchange reformer 12 for converting hydrocarbon fuels into a reformed gas stream that is used by electrochemical fuel cells 30 to generate electricity. The reformer 12 has an intake port 20 for receiving feed gas, typically gasoline, natural gas, or some other type of hydrocarbon, from a reservoir (not shown) and an outlet port 22 for removing the processed reformed feed gas from the reformer 12. The feed gas may also comprise any combination of water, oxygen, nitrogen, carbon monoxide, carbon dioxide, and hydrogen. The feed gas is processed into a reformed gas within the reformer 12. Processes used to convert the feed gas into the reformed gas include steam reforming, auto thermal reforming, partial oxidation, preferential oxidation, high temperature shift processing, low temperature shift processing, or some other type of processing that is known in the art. In addition, the reformer 12 has a burner inlet port 24 from fuel cell 30 for receiving heated burner exhaust gas and/or a partially or wholly unreacted mixture of fuel and oxidant (hereinafter referred to as burner exhaust gas). The reformer 12 also has a burner outlet port 26 for removing cooled burner exhaust gas from the reformer 12. The reformer 12 may also contain a high temperature/low temperature shift reactor (not shown) and/or a preferential reactor (not shown) for converting carbon monoxide gas to carbon dioxide in a method that is known in the art. Ideally, the reform gas leaving the reformer 12 will contain less than 10 parts per million (ppm) carbon monoxide. This is important for two reasons. First carbon monoxide is undesirable to release into the atmosphere. Second, carbon monoxide may react within the fuel cell 30 to coat the fuel cell catalyst that is used to facilitate reactions during the oxidation process, and thus excess carbon monoxide will limit the efficiency of the fuel cell 30 over time.

Processed reform gas, typically hydrogen or some hydrogen rich gas, exits the outlet port 22 and enters the anode inlet 32 into an anode chamber 33 of an electrochemical fuel cell 30. A series of individual electrochemical fuel cells 30 form a fuel cell stack 31. A catalyst (not shown) coated on the walls of the anode chamber 33 of the electrochemical fuel cell 30 oxidizes the hydrogen atoms into electrons and protons. The electrons escape through a wire 36 coupled to the electrochemical fuel cell to a generator 38. The hydrogen protons travel through an electrolyte membrane 34 to a cathode chamber 39 and combine with oxygen that is fed into the cathode inlet 40 of the electrochemical fuel cell 30 to form water and heat (which are the only emissions products if pure hydrogen is used as the input gas feed) that are expelled from the electrochemical cells 30 through outlet ports 42, 44.

Under normal operating conditions, the oxidation of reform gas is approximately 80-90% complete. Unoxidized reform gas then exits the anode chamber 33 via the anode outlet 46 and enters a combuster 50 for burning. The unoxidized reform gas is converted to carbon dioxide and water within the combuster, ideally at between 500-900 degrees Celsius, in a process that is well known in the art.

During transient operating conditions, a condition that occurs when the electrical load on the electrochemical fuel cell 30 changes based on load demand, the reform gas is typically allowed to exit the anode chamber 33 through outlet 46 without electrochemical oxidation (utilization) in much greater quantities. This is done to minimize the buildup of reform gas within the anode chamber 33, a condition that may damage the fuel cell 30. This reform gas may then be recirculated through the cell 30 or is allowed to enter the combuster 50. In the former case, this recycling and injection of hydrogen depleted tail gas leads to increased parasitic power loss. In the latter case, burning of fuel in the combuster 50 increases the combuster temperatures and may accelerate the corrosion of combuster material. This can lead to reduced fuel cell system efficiency. The increased temperatures within the combuster 50 for example may reach as high as 1400-1500 degrees Celsius during transient load conditions.

To help to alleviate these problems, an energy storage device 80 is attached in parallel to the fuel cell 30. The energy storage device 80 may be a battery pack, a bank of capacitors (or super capacitors) or other storage devices or combinations thereof. The energy storage device 80 provides power during normal or transient operations. The energy storage device 80 is allowed to maintain a power capacity, or charge level, at a predetermined level during nominal operation less than the maximum charge level. During electrical load transition, or transient load conditions, the excess unoxidized (unreacted) reform gas within the anode chamber 33 that would normally be discharged to the combuster 50 in large amounts is instead electrochemically oxidized to charge the energy storage device 80 towards full capacity. The size and charge level of the energy storage device 80 is a sized to maintain the percentage of unoxidized fuel discharging the anode chamber 33 to the combuster 50 at a nearly uniform level. In a preferred embodiment, the charge level is maintained at approximately 80% of full capacity.

After normalization of the fuel flow and load demand in the anode chamber 33, the energy storage device 80 may slowly discharge the excess charge to the predetermined charge level to allow for additional charge to be accepted during the transient period. Both the fuel processing assembly 10 and energy storage device 80 can be operated continuously or the energy storage device 80 can be operated intermittently to maintain the charge level.

Figure 2:
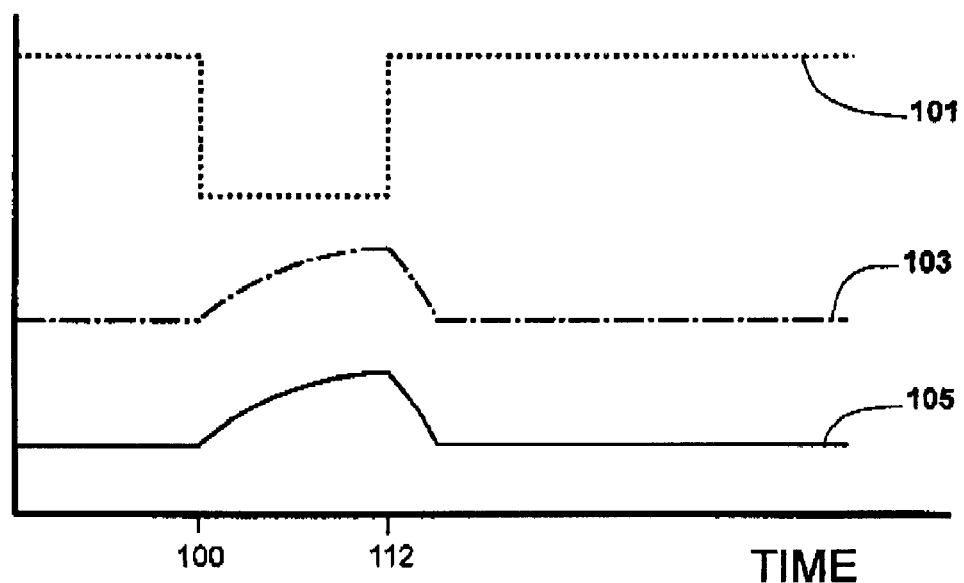
FIG. 2 is a graphical representation of how the power levels, anode exhaust levels, and combuster temperature change relative to time in transient load conditions in a fuel cell power generation system without an energy storage device.
Figure 3:
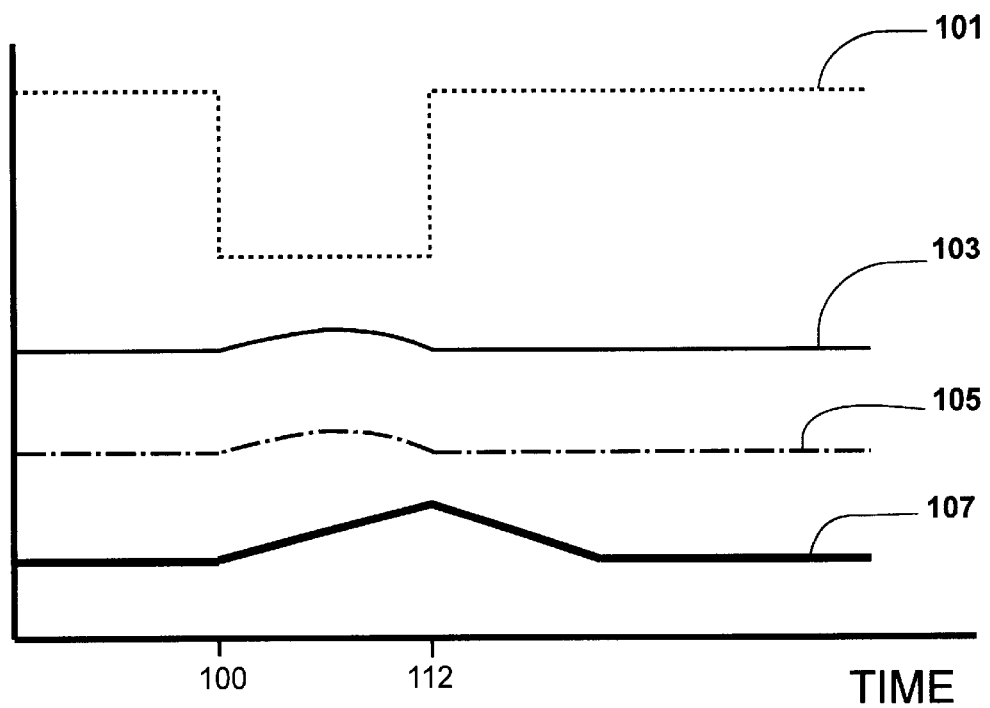
FIG. 3 is a graphical representation of how the power levels, anode exhaust levels, and combuster temperature change relative to time in transient load conditions in a fuel cell power generation system with an energy storage device of FIG. 1, wherein the fuel cell power generation system is idealized.
Figure 4:
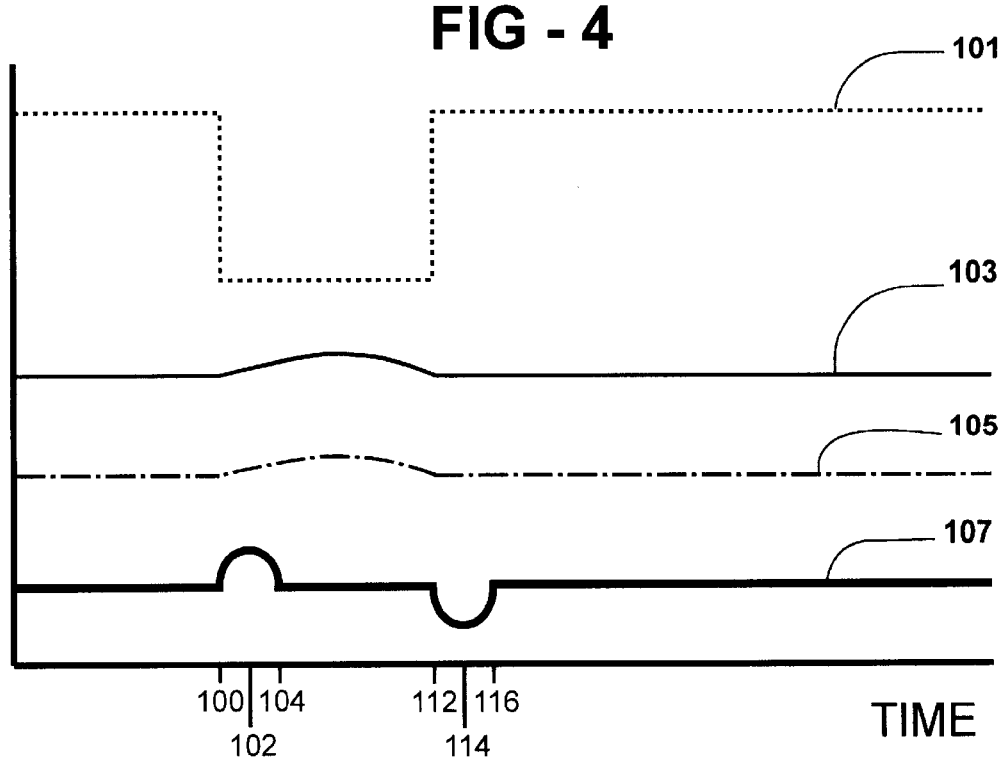
FIG. 4 is a graphical representation of how the power levels, anode exhaust levels, and combuster temperature change relative to time in transient load conditions in a fuel cell power generation system with an energy storage device of FIG. 1, wherein the fuel cell power generation system is not idealized.

FIGS. 2-4 compare fuel cell generation power systems both with and without the energy storage device for changes in power levels, unoxidized anode exhaust volume, combuster temperature, and energy storage device power levels before, during and after a transient load condition. These are depicted on lines 101, 103, 105, and 107 respectively. In FIG. 3, the energy storage device is assumed to be capable of continually storing energy during the entire transient load event, and thus the flow of anode gas entering the fuel cell remains constant. In FIG. 4, the flow of anode gas entering the fuel cell is controlled using a controller, and hence the storage of energy by the energy storage device fluctuates during the course of the transient load event.

As seen in FIG. 2, during transient electrical load, as depicted between times 100 and 112, the power level along line 101 drops to a transient load condition. Processed reformer gas contained within the anode chamber 33 and peripheral volume does not chemically oxidize, and thus the level of unoxidized fuel exiting the anode chamber 33 to the combuster 50 correspondingly increases, as depicted on line 103. Fuel rich gas entering the combuster 50 raises the temperature within the combuster 50, as is depicted on line 105. These elevated temperatures may damage various components of the combuster 50 and fuel cell power generation system.

In the present invention, as seen in FIG. 3, during transient electrical load conditions reformer gas contained within the anode chamber 33 is allowed to electrochemically oxidize and electrical power generated is stored in the energy storage device 80. This is depicted by the increase in energy along line 107. This prevents the buildup of the unoxidized gas within the anode chamber 33 that subsequently enters the combuster 50, which is depicted along line 103. Also, combustion temperatures within the combuster 50 are maintained at levels similar to normal operating conditions as shown on line 105. The amount of reformer gas entering the anode chamber 33 from the reformer 12 is held constant during both normal and transient load conditions.

Referring now to FIG. 4, the amount of unoxidized gas entering the anode chamber is lessened at time 100 in response to the transient load condition. As this condition is not idealized, as in FIG. 3, there is typically a lag between the time the controllers (not shown) direct that the amount of unoxidized gas entering the anode chamber is lessened and the actual lessening of the amount of unoxidized fuel entering the anode chamber 33. Thus, along line 107, the energy storage device 80 will absorb the excess energy until time 102. At time 102, the amount of unoxidized gas entering the anode chamber 33 is lowered to a level sufficient not to require the energy storage device 80 to be necessary. Thus, at time 102, the energy storage device 80 dissipates the excess energy back to its original predetermined level. Similarly, at time event 112, wherein the electrical load demand is stepped back up to normal levels, there is not enough unoxidized fuel within the anode chamber to support the change, hence the energy storage device 80 provides the excess energy necessary to maintain the generator at the power level desired. This corresponds to the dip in energy storage power level from time 112 to 114. As the controller directs more unoxidized fuel to enter the anode chamber 33, the storage level of electrical power in the energy storage device 80 can be returned to its normal level as depicted at time 116.

The energy storage device 80 serves many important functions. First, the energy storage device prevents the buildup of excessive quantities of unoxidized fuel in the anode chamber 33 during transient load conditions, fuel that ultimately may damage the combuster 50.

Second, the energy storage device functions as a reserve energy source in times where more electrical power may be required by the system. Most importantly, the addition of an energy storage device 80 functions to maintain the amount of unoxidized fuel entering the combuster 50 during transient load conditions to levels approximately the same as in normal operating conditions. In this way, the combuster 50 temperature is maintained within an acceptable temperature range preferably between 500 and 900 degrees Celsius. Ultimately, this protects the life of the combuster 50 and fuel cell 30 without the use of expensive material within the combuster or fuel processing assembly 10.

While the invention has been described in terms of preferred embodiments, it will be understood, of course, that the invention is not limited thereto since modifications may be made by those skilled in the art, particularly in light of the foregoing teachings.

What is claimed is:

1. A fuel processing assembly system comprising:
   a reformer;
   a fuel cell coupled to said reformer, said fuel cell having an anode chamber, an electrolyte membrane, and a cathode chamber, said fuel cell capable of electrochemically oxidizing a first quantity of a reformer gas contained within said anode chamber during a normal load condition and capable of electrochemically oxidizing a second quantity of said reformer gas during a transient load condition;
   a combuster coupled to said fuel cell;
   a generator coupled to said fuel cell, said generator converting a first quantity of electrical charge generated by the oxidation of said first quantity of said reformer gas from said fuel cell to power during said normal load condition and converting a second quantity of electrical charge generated by the oxidation of said second quantity of said reformer gas to power during a transient load condition; and
   an energy storage device coupled with said fuel cell, said energy storage device capable of storing a third quantity of electrical charge generated by the oxidation of a third quantity of said reformer gas during said transient load condition, thereby maintaining the unoxidized amount of said reformer gas entering said combuster from said anode chamber during said normal load conditions or said transient load conditions at a nearly constant level.

2. The fuel processing assembly of claim 1, wherein said energy storage device is selected from the group consisting of a battery pack, a plurality of capacitors and a plurality of supercapacitors.

3. The fuel processing assembly of claim 1, wherein said energy storage device is set to a predetermined energy storage capacity less than a maximum energy storage capacity for said energy storage device, said predetermined energy storage capacity being a function of the maximum transient load change of the fuel processing assembly and the volume of said anode chamber.

4. The fuel processing assembly of claim 3, wherein said predetermined energy storage capacity is approximately eighty percent of said maximum energy storage capacity for said energy storage device.

5. A method for controlling combuster temperature in a fuel cell power generation system, the method comprising the step of:
   charging a generator as a function of a transient electrical load demand for the fuel cell power generation system by oxidizing approximately a first percentage of a reformer gas contained within said anode chamber during a transient load condition;
   charging an electrical storage device coupled with the fuel cell power generation system from a predetermined first state of charge to a second state of charge by oxidizing a second percentage of said reformer gas contained within said anode chamber during said transient load condition, wherein the sum of said first percentage and said second percentage is sufficient to maintain a combuster burning temperature below a predetermined maximum temperature.

6. The method of claim 5 further comprising the step of discharging said electrical storage device from said second state of charge to said predetermined first state of charge when the fuel cell power generation system is in said non-transient load condition.

7. The method of claim 5 further comprising the step of discharging said electrical storage device from said second state of charge to said predetermined first state of charge when the fuel cell power generation system is in said transient load condition and when the unoxidized amount of said reformer gas entering said anode chamber has been reduced to a first level, said first level corresponding to the amount of said reformer gas sufficient to maintain said generator at a state of charge approximately equal to the electrical load demand of the fuel cell power generation system at said transient load condition.

8. The method of claim 5, wherein the step of charging from a predetermined first state of charge to a second state of charge an electrical storage device comprises the step of charging from a predetermined first state of charge to a second state of charge a battery pack coupled with a fuel cell contained within the fuel cell power generation system by oxidizing a second percentage of said reformer gas contained within said anode chamber during a transient load condition, wherein the sum of said first percentage and said second percentage is sufficient to maintain a combuster burning temperature below a predetermined maximum temperature.

9. The method of claim 5, wherein the step of charging from a predetermined first state of charge to a second state of charge an electrical storage device comprises the step of charging from a predetermined first state of charge to a second state of charge a plurality of capacitors coupled in parallel with a fuel cell contained within the fuel cell power generation system by oxidizing a second percentage of said reformer gas contained within said anode chamber during a transient load condition, wherein the sum of said first percentage and said second percentage is sufficient to maintain a combuster burning temperature below a predetermined maximum temperature.

10. The method of claim 5, wherein the step of charging from a predetermined first state of charge to a second state of charge an electrical storage device comprises the step of charging from a predetermined first state of charge to a second state of charge a plurality of supercapacitors coupled in parallel with said fuel cell contained within the fuel cell power generation system by oxidizing a second percentage of said reformer gas contained within said anode chamber during a transient load condition, wherein the sum of said first percentage and said second percentage is sufficient to maintain a combuster burning temperature below a predetermined maximum temperature.

11. The method of claim 5, wherein said predetermined first state of charge is a function of the maximum amount of change in electrical load demand during said transient load condition and as a function of the volume of said anode chamber.

12. The method of claim 11, wherein said predetermined first state of charge is approximately eighty percent of a maximum electrical storage capacity of said electrical storage device.

13. The method of claim 5, wherein said predetermined maximum temperature is approximately nine hundred degrees Celsius.

14. The method of claim 5, wherein the sum of said first percentage and said second percentage of said reformer gas comprises at least eighty percent of an amount of said reformer gas contained within said anode chamber.

15. A method for controlling the amount of reformer gas entering a combuster during a transient load condition in a fuel cell power generation system, the method comprising the steps of:

coupling an electrical storage device to a fuel cell contained in the fuel cell power generation system; and storing a quantity of electrical charge in said electrical storage device, wherein said quantity of electrical charge is produced by oxidizing an amount of a reformer gas within an anode chamber of said fuel cell during the transient load condition.

16. The method of claim 15 further comprising the step of discharging said quantity of electrical charge from said electrical storage device when the fuel cell power generation system returns to a normal load condition.

17. The method of claim 15 further comprising the step of discharging said quantity of electrical charge from said electrical storage device during said transient load condition when the amount of said reformer gas entering said anode chamber is reduced to a first level, said first level corresponding to the amount of said reformer gas sufficient to maintain said generator at a state of charge approximately equal to the electrical load demand of the fuel cell power generation system at said transient load condition.

18. The method of claim 15, wherein said electrical storage device is selected from the group consisting of a battery pack, a plurality of capacitors, and a plurality of supercapacitors.

19. The method of claim 15 further comprising the step of maintaining a substantially constant amount of said reformer gas entering a combuster from said anode chamber in response to the step of storing said quantity of electrical charge in said electrical storage device.

20. The method of claim 15, wherein an electrical charge storage capacity of said electrical storage device is sufficient to allow the oxidation of at least eighty percent of said reformer gas contained within said anode chamber during the transient load condition.

* * * * *